US008561130B2

(12) United States Patent
Jogand-Coulomb

(10) Patent No.: US 8,561,130 B2
(45) Date of Patent: Oct. 15, 2013

(54) PERSONAL LICENSE SERVER AND METHODS FOR USE THEREOF

(75) Inventor: Fabrice E. Jogand-Coulomb, San Carlos, CA (US)

(73) Assignee: SanDisk Technologies Inc., Plano, TX (US)

( * ) Notice: Subject to any disclaimer, the term of this patent is extended or adjusted under 35 U.S.C. 154(b) by 1018 days.

(21) Appl. No.: 12/070,689

(22) Filed: Feb. 19, 2008

(65) Prior Publication Data

US 2009/0210923 A1  Aug. 20, 2009

(51) Int. Cl.
*G06F 17/00* (2006.01)

(52) U.S. Cl.
USPC .................. 726/1; 726/26; 713/150; 713/158

(58) Field of Classification Search
USPC .............................................. 726/1
See application file for complete search history.

(56) References Cited

U.S. PATENT DOCUMENTS

| | | | |
|---|---|---|---|
| 5,260,999 A | 11/1993 | Wyman | |
| 2003/0005135 A1* | 1/2003 | Inoue et al. | 709/229 |
| 2003/0140009 A1* | 7/2003 | Namba et al. | 705/59 |
| 2004/0249815 A1* | 12/2004 | Lee | 707/9 |
| 2005/0091507 A1* | 4/2005 | Lee et al. | 713/182 |
| 2006/0031170 A1 | 2/2006 | Septon | |
| 2006/0069652 A1* | 3/2006 | Ebihara et al. | 705/59 |
| 2006/0080535 A1 | 4/2006 | Elazar et al. | |
| 2006/0242068 A1 | 10/2006 | Jogand-Coulomb et al. | |
| 2007/0033395 A1* | 2/2007 | MacLean | 713/157 |
| 2007/0043667 A1 | 2/2007 | Qawami et al. | |
| 2007/0056042 A1 | 3/2007 | Qawami et al. | |
| 2007/0219917 A1* | 9/2007 | Liu et al. | 705/59 |
| 2008/0065552 A1* | 3/2008 | Elazar et al. | 705/59 |
| 2008/0178001 A1* | 7/2008 | Kim et al. | 713/167 |
| 2008/0310620 A1* | 12/2008 | Kim et al. | 380/28 |

OTHER PUBLICATIONS

Examination Report for EP Application No. 09 713 151.0-1245, 5 pages, Feb. 10, 2011.
Fabrice Jogand-Coulomb, Robert C. Chang, "Method for Interfacing with a Memory Card to Access a Program Instruction", filed on Aug. 25, 2006 as U.S. Appl. No. 11/509,978.
Fabrice Jogand-Coulomb, Robert C. Chang, "System and Computing Device for Interfacing with a Memory Card to Access a Program Instruction", filed on Aug. 25, 2006 as U.S. Appl. No. 11/510,297.

(Continued)

*Primary Examiner* — Shewaye Gelagay
(74) *Attorney, Agent, or Firm* — Brinks Hofer Gilson & Lione

(57) ABSTRACT

A personal license server and methods for use thereof are disclosed. In one embodiment, a personal license server is provided comprising a memory and circuitry operative to receive a digital rights management (DRM) license from a license server, store the DRM license in the memory, and provide the DRM license to a personal license server client, wherein the personal license server client receives the DRM license without communicating with the license server. In another embodiment, a personal license server client is provided that receives, from a license requester, a request for a digital rights management (DRM) license from a license server; in response to the request, communicates with a personal license server instead of the license server to receive the DRM license; and provides the DRM license to the license requester. Other embodiments are provided, and each of these embodiments can be used alone or in combination with one another.

16 Claims, 9 Drawing Sheets

(56) References Cited

OTHER PUBLICATIONS

Susan Cannon, Kevin Lewis, "Method for Interacting with a Memory Device in Cryptographic Operations", filed on Aug. 28, 2006 as U.S. Appl. No. 11/511,766.

Susan Cannon, Kevin Lewis, "Memory Device for Cryptographic Operations", filed on Aug. 28, 2006 as U.S. Appl. No. 11/511,687.

Fabrice Jogand-Coulomb, Haluk Kent Tanik, Oktay Rasizade, "Methods for Linking Content With License", filed on Nov. 14, 2006 as U.S. Appl. No. 11/599,655.

Fabrice Jogand-Coulomb, Farshid Sabet Sharghi, Bahman Qawami, "Apparatuses for Binding Content to a Separate Memory Device", filed on Nov. 14, 2006 as U.S. Appl. No. 11/600,245.

Fabrice Jogand-Coulomb, Farshid Sabet Sharghi, Bahman Qawami, "Methods for Binding Content to a Separate Memory Device", filed on Nov. 14, 2006 as U.S. Appl. No. 11/600,262.

Fabrice Jogand-Coulomb, Haluk Kent Tanik, Oktay Rasizade, "Methods for Accessing Content Based on a Session Ticket", filed on Nov. 14, 2006 as U.S. Appl. No. 11/600,263.

Fabrice Jogand-Coulomb, Haluk Kent Tanik, Oktay Rasizade, "Apparatuses for Linking Content with License", filed on Nov. 14, 2006 as U.S. Appl. No. 11/600,270.

Fabrice Jogand-Coulomb, Haluk Kent Tanik, Oktay Rasizade, "Apparatuses for Accessing Content Based on a Session Ticket", filed on Nov. 14, 2006 as U.S. Appl. No. 11/600,273.

Fabrice Jogand-Coulomb, David, Guidry, Pascal Caillon, Benjamin Vigier, "Apparatuses for Launching a Program Application", filed on Dec. 29, 2006 as U.S. Appl. No. 11/647,758.

Fabrice Jogand-Coulomb, David, Guidry, Pascal Caillon, Benjamin Vigier, "Methods for Launching a Program Application", filed on Dec. 29, 2006 as U.S. Appl. No. 11/647,995.

Fabrice Jogand-Coulomb, Oktay S. Rasizade, Haluk K. Tanik, "Method for Allowing Multiple Users to Access Preview Content", filed on Nov. 14, 2006 as U.S. Appl. No. 11/599,994.

Fabrice Jogand-Coulomb, Oktay S. Rasizade, Haluk K. Tanik, "System for Allowing Multiple Users to Access Preview Content", filed on Nov. 14, 2006 as U.S. Appl. No. 11/599,995.

Fabrice Jogand-Coulomb, Haluk K. Tanik, Oktay S. Rasizade, "Method for Allowing Content Protected by a First DRM System to Be Accessed by a Second DRM System", filed on Nov. 14, 2006 as U.S. Appl. No. 11/600,005.

Fabrice Jogand-Coulomb, Haluk K. Tanik, Oktay S. Rasizade, "System for Allowing Content Protected by a First DRM System to Be Accessed by a Second DRM System", filed on Nov. 14, 2006 as U.S. Appl. No. 11/599,991.

Fabrice Jogand-Coulomb, Pascal A. Caillon, Benjamin Vigier, "Method for Connecting to a Network Location Associated with Content", filed on Nov. 14, 2006 as U.S. Appl. No. 11/600,300.

Written Opinion and Search Report for PCT/US2009/000237, 9 pages, Mar. 24, 2009.

Text of the First Office Action for Chinese Application No. 2009801056656, dated Jul. 16, 2012, 12 pages.

* cited by examiner

PERSONAL LICENSE SERVER AND METHODS FOR USE THEREOF

BACKGROUND

The Internet worldwide network enables many digital appliances to interconnect and exchange information. A particular use of the Internet is to distribute digital files, specifically digital content (such as digital books, music or video files, or games) to connected appliances. The proliferation and distribution of such files is substantial. For example, various devices, programs, and methods are available to listen to digital music, and an increasing number of music titles exist in digital form. Unfortunately, there exists a substantial amount of illegal copies of such files. Digital rights management (DRM) systems have been developed to address this difficulty. Part of the function of a typical DRM system is to define the form of a "rights-protected file"—a digital content file with rights that enable use of the file under limitations defined by the owner of the digital content. Access to DRM-protected content requires an associated license, and the DRM-protected content is usually associated with some data that points to a license server and the associated license. Some other DRM systems keep information about the server that delivers the content as a mechanism to review the associated license. In operation, a device contacts a license server to either initially acquire the license or to later renew the license, if the license has expired. However, license renewal or acquisition requires connecting to a remote license server in a process that relies on a network protocol. For example, the Internet can be used to connect to a specific URL of a license server. In some situations, access to the license server may not be convenient, thereby preventing a user from acquiring or renewing a license.

Instead of using the Internet to distribute digital content, digital content can be stored and distributed on memory cards or other portable memory devices in a process known as "super-distribution." With "super-distribution," the digital content is freely distributed, but the license for use of the super-distributed, DRM-protected content is acquired from a license server at the time the user chooses to access the content. Again, if access to the license server is not convenient, the user would be prevented from acquiring the license needed to use the super-distributed, DRM-protected content.

SUMMARY

The present invention is defined by the claims, and nothing in this section should be taken as a limitation on those claims.

By way of introduction, the embodiments described below provide a personal license server and methods for use thereof. Computer-readable storage media with computer programs with instructions are also provided. In one embodiment, a personal license server is provided comprising a memory and circuitry operative to receive a digital rights management (DRM) license from a license server, store the DRM license in the memory, and provide the DRM license to a personal license server client, wherein the personal license server client receives the DRM license without communicating with the license server. In another embodiment, a personal license server client is provided that receives, from a license requester, a request for a digital rights management (DRM) license from a license server; in response to the request, communicates with a portable license server instead of the license server to receive the DRM license; and provides the DRM license to the license requester.

In some embodiments, the personal license server and the personal license server client are in separate devices, whereas in other embodiments, the personal license server and the personal license server client are in a same device. It should be noted that the personal license server can be part of any suitable device, such as, but not limited to, a memory card, a host device operative to be connected with a memory card, and a network-attached storage (NAS) device. The device that comprises the personal license server client can also comprise a playback system requiring the DRM license, and a playback system requiring a DRM license can be in a different device from a device running the personal license server client. The personal license server client can communicate with the personal license server using a same protocol as when communicating with the license server, or a different protocol can be used. Also, the DRM license provided to the personal license server client can be different from the DRM license received by the personal license server from a license server. Further, in some embodiments, name resolution can be performed by a personal license server client, while in other embodiments, the device that runs the personal license server performs name resolution.

Each of these embodiments described herein can be used alone or in combination with one another. Various embodiments will now be described with reference to the attached drawings.

DETAILED DESCRIPTION OF THE PRESENTLY PREFERRED EMBODIMENTS

The following embodiments are generally directed to systems with digital rights management (DRM) and the acquisition and/or renewal of a content license; more specifically, the following embodiments improve content portability and allow use of a mobile device as a portable license server.

Figure 1:
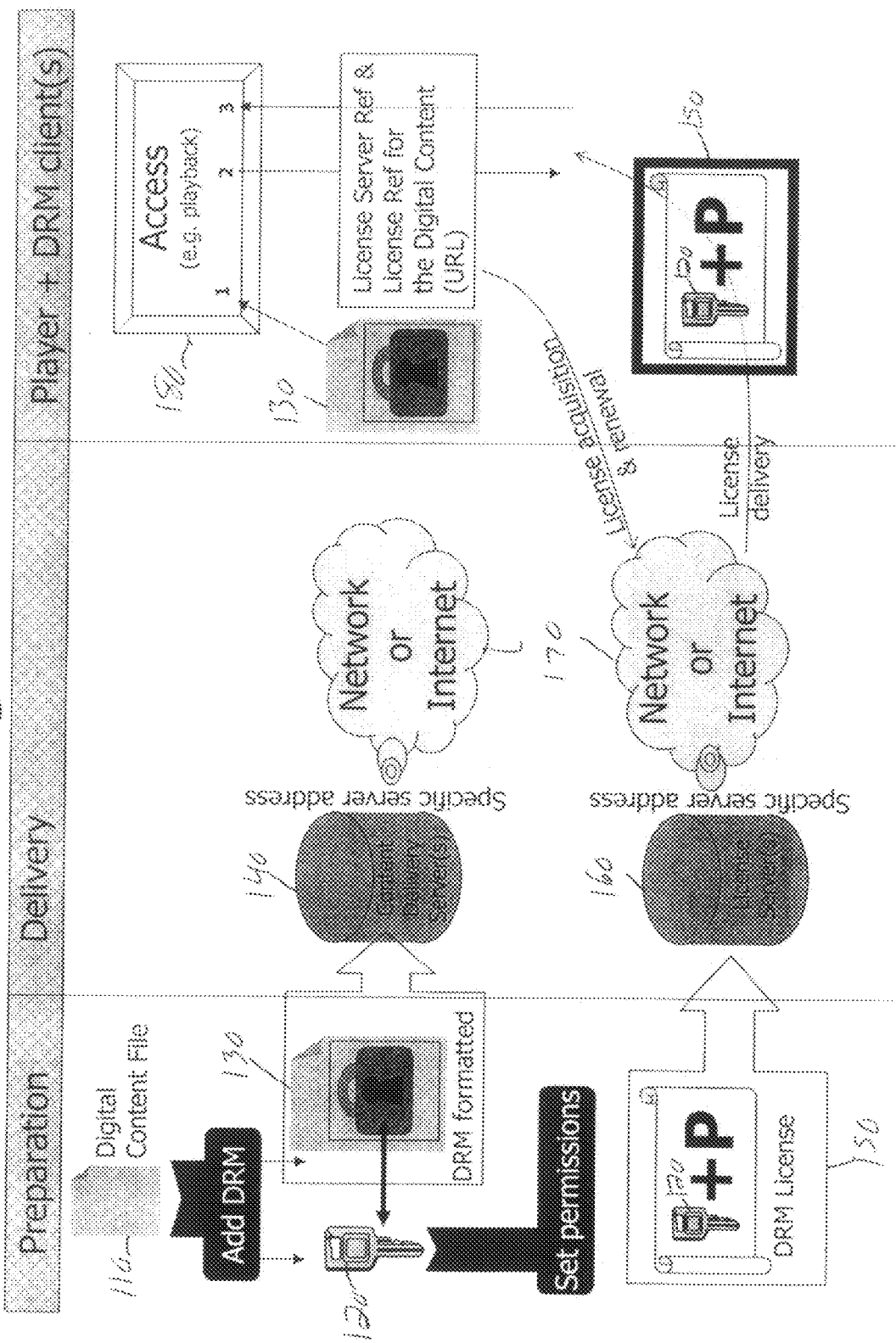
FIG. 1 is an illustration of a prior art digital rights management (DRM) system.

Turning now to the drawings, FIG. 1 is an illustration of a prior art DRM system where digital content is delivered in a protected format and requires a license to be accessed. It should be noted that "digital content" can take any suitable form, such as, but not limited to, audio (e.g., a song, spoken word, a podcast, one or a series of sounds, etc.), video (with or without accompanying audio) (e.g., a movie, an episode of a TV show, a news program, etc.), still or moving images (e.g., a picture, a computer-generated display, etc.), text (with or without graphics) (e.g., an article, a text file, etc.), a web page, a game, and a hybrid multi-media presentation of two or more of the foregoing forms. As digital content can take any suitable form, the claims should not be read as requiring a specific type of digital content unless explicitly recited therein.

As shown in FIG. 1, to prepare digital content for use in the DRM system, DRM is added to the digital content 110. Specifically, the digital content 110 is encrypted with a key 120 to create a DRM-formatted file 130. (The DRM-formatted file 130 also contains data that points to the license server(s) 160 and associated license, as described below). The DRM-formatted file 130 is stored on one or more content delivery servers 140. In this embodiment, a DRM license 150 is created with the key 120 and permissions P. (It is important to note that this DRM license format is merely one example and that these embodiments can be used with other DRM license formats). The permissions P can describe, for example, when the digital content can be played, how many times the digital content can be played, which users can play the digital content, etc. The DRM license 150 is stored on one or more license servers 160. Both the content delivery servers 140 and the license servers 160 are in communication with a network or the Internet 170. As used herein, the phrase "in communication with" means directly in communication with or indirectly in communication with through one or more components, which may or may not be shown or described herein. Two components can be in wired or wireless communication with each other.

Using the network or Internet 170, a device can download the DRM-formatted file 130 from the content delivery server (s) 140. As used herein, a "device" refers to a device that uses electricity for some or all of its functionality. A "device" can be a wired or wireless device and can be portable or relatively stationary. A "device" can be a consumer electronic device, such as, but are not limited to, a mobile device (e.g., a mobile phone handset), a game device, a personal digital assistant (PDA), an email/text messaging device, a digital camera, a digital media/content player, a personal computer, a memory card (e.g., a secure memory card, a megaSIM card, a smart card, etc.), and a GPS navigation device. A "device" may be referred to as a "personal portable (or mobile) device" in these embodiments when the device takes the form of a portable/mobile device that is intended to be used by an individual user. A "device" may be referred to as a "host device" when that device can accept (or "host") a memory card or other type of peripheral.

In this embodiment, the device takes the form of a digital content player 180. As mentioned above, the DRM-formatted file 130 contains data that points to the license server(s) 160 and associated license 150. Using this data, which can be in the form of a URL, the DRM client on the player 180 accesses the license server(s) 160 via the network or Internet 170 to acquire (or renew) the license 150. After the license 150 is delivered to the player 180, the DRM client on the player 180 uses the key 120 to decrypt the protected digital content 130 (to provide "in the clear" content 110) and provides the player 180 with access to the content 110, as specified in the permissions P.

In the above example, the DRM system associated a DRM license server URL with the DRM-protected content. Such URL was used to acquire and/or renew a license, as it pointed to the license server and contained the reference of the license to be acquired. The use of a URL associated with DRM-protected content to specify where to acquire a DRM license for that content is common with DRM systems, such as Open Mobile Alliance ("OMA") DRM and Microsoft DRM. As mentioned above, access to the license server may not always be convenient or reachable at that time, thereby preventing a user from acquiring or renewing a license.

The following embodiments address this situation. In general, a personal license server (PLS) on a first device is used to receive and store a license from a license server. When a second device needs the license, the second device can retrieve the license from the PLS instead of the original license server. Accordingly, the second device can acquire and/or renew a license even when the original license server is not available to the second device.

Figure 2:
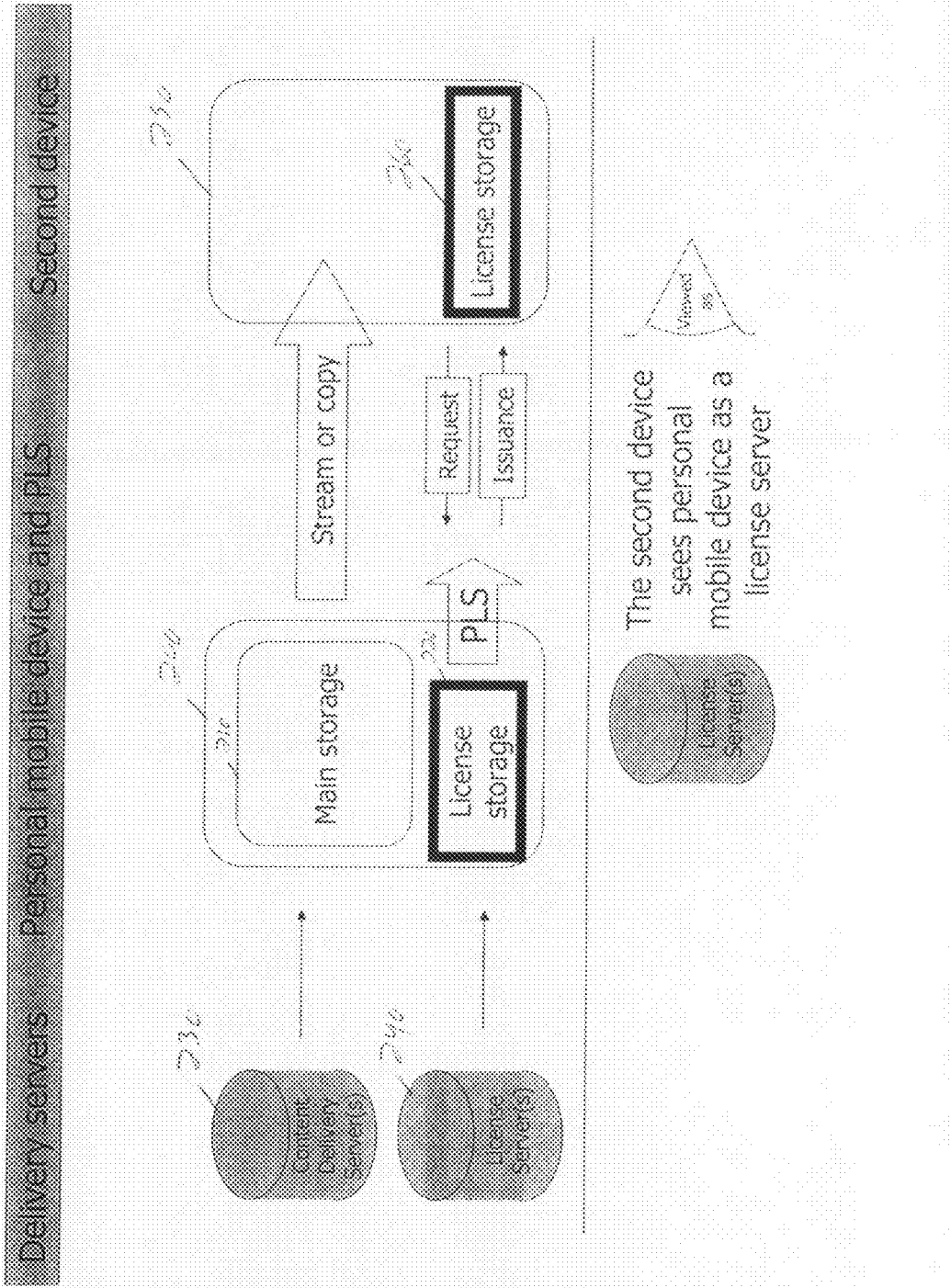
FIG. 2 is an illustration of a system using a personal license server (PLS) of an embodiment.

Returning to the drawings, FIG. 2 is an illustration of a system using a personal license server (PLS) of an embodiment. As shown in FIG. 2, a first personal mobile (i.e., portable) device 200 comprises a main storage 210 and a license storage 220. As with the example discussed above in conjunction with FIG. 1, the first personal mobile device 200 can communicate with content delivery server(s) 230 to download digital content for storage in the main storage 210. Similarly, the first personal mobile device 200 can communicate with license server(s) 240 to download the appropriate DRM license for the digital content for storage in the license storage 210. (Instead of being acquired and/or renewed from the license server(s) 240, the DRM licenses could be preloaded onto the first personal mobile device 200.) A difference occurs, however, when the first personal mobile device 200 streams or copies the digital content to a second portable mobile device 250 (or, alternatively, when the second portable mobile device 250 drives the steam/copy process). Instead of the second personal mobile device 250 contacting the license server(s) 240 for the appropriate license, a PLS client in the second portable mobile device 250 sends a request for the appropriate license to the first personal mobile device 200. In response to the request, the first personal mobile device 250 issues the appropriate license to the second personal mobile device 250, and the second personal mobile device stores it in its own license storage 260.

Accordingly, the first personal mobile device 250 effectively becomes a "personal license server (PLS)" for the second personal mobile device 250. This license server is "personal" in the sense that it is not a general, dedicated license server. Rather, it acquires a license from a general, dedicated license server for delivery to a given user or device. In general, the memory in the PLS that stores the DRM license and other data can take any suitable form, such as, but not limited to, a non-volatile solid-state memory (e.g., flash memory), optical memory, and magnetic memory, and can be one-time programmable, few-time programmable, or many-time programmable. Also, the PLS functionality can be implemented in any suitable circuitry (e.g., a pure hardware implementation and/or a combined hardware/software (or firmware) implementation). Accordingly, "circuitry" can take the form of one or more of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. In one embodiment, the PLS client interacting with the PLS takes the form of a computer-readable storage medium comprising operational instructions that are executable by a processor.

As diagrammatically shown in FIG. 2, the second personal mobile device 250 sees the first personal mobile device 200 as a license server. As such, the appropriate license is available to the second personal mobile device 250 (through the first personal mobile device 200) even when the license server(s) 240 are not available. It should be noted that the license delivered to the second personal mobile device 250 can be identical to the license stored in the license storage 220 of the first personal mobile device 200 or it can be different. For example, the license delivered to the second personal mobile device 250 can be limited, temporary, or delivered according to its DRM capabilities.

Preferably, both the first and second personal mobile devices 200, 250 use the same protocol to acquire and/or renew a license as in the embodiment shown in FIG. 1. Accordingly, the second personal mobile device 250 would use the same protocol to acquire the license from the PLS as it would from the actual license server(s) 240. That is, the PLS can deliver a license to the second personal mobile device 250 using the same protocol as the one the second personal mobile device 250 would have used to acquire a license from the actual license server(s) 240 if the PLS was not available. Embodiments presented later in this document will discuss formatting or reformatting a URL for the second personal mobile device 250 to get a license from the PLS instead of the actual license server(s) 240. Those embodiments will also discuss how to format a URL to ensure maximum compatibility with systems that may not be enable to work with a PLS.

As illustrated in FIG. 2, there can be three main entities in this PLS system: the license requester, the PLS client application, and the PLS. Together, the PLS and the PLS client application form the equivalent of a license server, as viewed by the license requestor. With these entities, the PLS allows using personal DRM licenses with multiple devices. It is important to note that these three entities can be distributed in any desired manner in one or more devices. For example, in FIG. 3A, a second personal mobile device 300 (here, a mobile phone) contains both the PLS client 310, as well as the license requestor (here, a playback and DRM system) 320. In this embodiment, the memory card associated with the second personal mobile device 300 acts, in place of the first personal mobile device, as the PLS 340 and contains the license storage 350. Accordingly, with this embodiment, because the PLS 340/memory card is connected to the second personal mobile device 300 and does not require a network connection for communication, the second personal mobile device 300 can acquire and/or renew a DRM license locally even if a network connection to the main license server(s) 360 is not available. Another advantage in that a user only needs to pay for a license once and can then use content associated with that license on multiple devices (e.g., whatever device is connected to the PLS 340/memory card). As the main license is saved in the storage of one personal mobile device but can be used by multiple personal mobile devices, it solves many of the above-mentioned license acquisition and/or renewal issues and limitations and those that relate keeping multiple devices synchronized.

It should be noted that, in this embodiment, the playback and DRM system 320 of the second personal mobile device 300 is the "default" system 320 of the device 300 (i.e., no changes of the system 320 are needed for use with the PLS). In this way, a single protocol can be used to acquire and/or renew a license from the PLS 340 and from the remote license server(s) 360.

In operation, the playback and DRM system 320 sends a license request to the network stack/gateway and name resolution component 330 of the second personal mobile device 300. The network stack/gateway is unchanged from a regular device, but the name resolution is configured to point to the PLS 340 instead of the main license server(s) 360. This provides an advantage over other DRM systems that are capable of acquiring a license stored on first device only after they are customized to get the license from that first device. For example, some devices require modification to the DRM system or player of the device in order to access a license from a secure memory card. As another example, some devices use a different protocol to connect to a personal computer than the one used by the personal computer to acquire the license in the first place.

Figure 3:
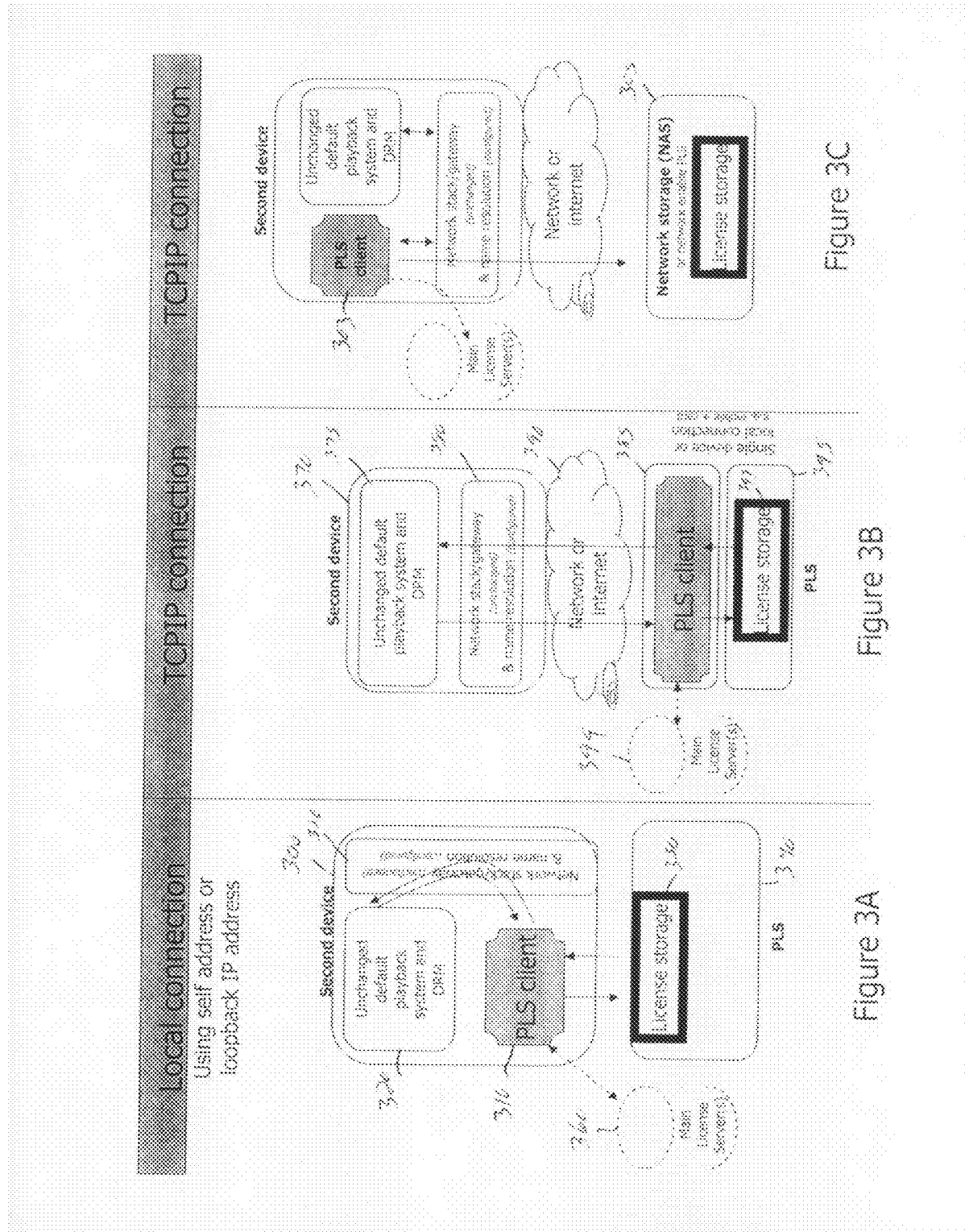
FIG. 3A is an illustration of an embodiment in which a PLS client is running here in a second personal mobile device.
FIG. 3B is an illustration of an embodiment in which a PLS client is running in a device separate from a second personal mobile device.
FIG. 3C is an illustration of an embodiment in which a PLS client contacts a network-attached storage (NAS) device to enable the PLS.

As mentioned above, various configurations of the license requester, the PLS client application, and the PLS are possible. FIG. 3B shows an example of another configuration. In this configuration, these components are distributed among separate devices. Specifically, in this example, a second personal mobile device 370 contains the license requestor (the default playback and DRM system) 375 and the network stack/gateway and name resolution component 380. Instead of being located in the second personal mobile device as in FIG. 3A, the PLS client 383 is located in a separate device (e.g., a mobile phone) 385 that communicates with the second personal mobile device 370 via a network or the Internet 390 using a TCPIP connection. The PLS 395 with its license storage 397 is located in yet another component (e.g., a memory card). (Alternatively, the PLS client 385 and the PLS 395 can be located in a single device). Accordingly, while the PLS client 310 can run on the second personal mobile device 300, as shown in FIG. 3A, the PLS client can also run in a different location accessible from the host requesting the license. As such, the PLS client can run on an intermediate device that is reachable from the second personal mobile device and that can also connect to the PLS device where the licenses are stored. The PLS client can also run on the PLS device when such device is network enabled. FIG. 3C shows that the PLS client 303 can also contact a network-attached storage (NAS) device 305 to enable the PLS. In general, an NAS is a hard drive with network capabilities. An NAS can be used to store any data, such as music and video files. When enabled as a PLS, the NAS can also store licenses.

Figure 4:
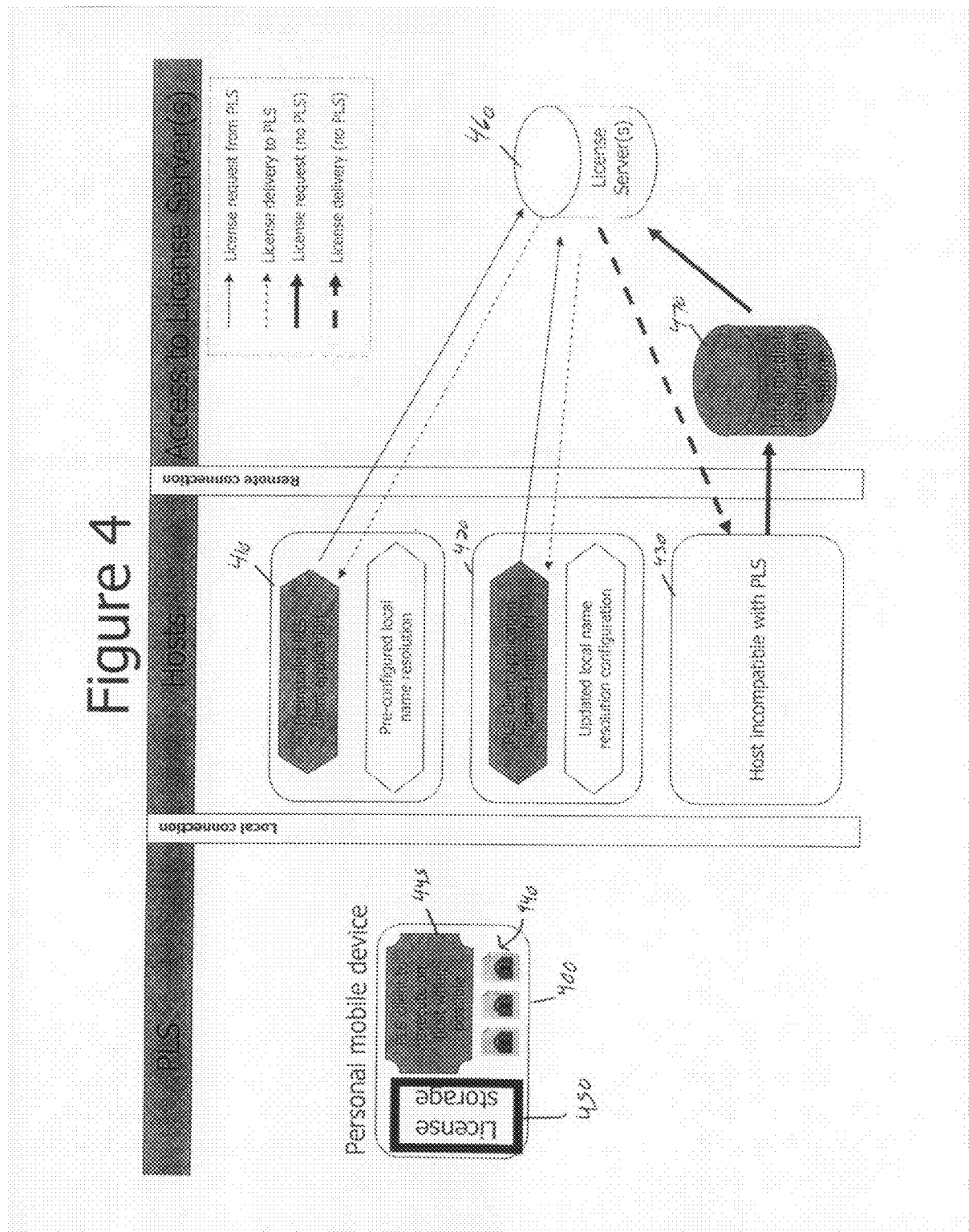
FIG. 4 is an illustration of exemplary implementations of a personal license server (PLS) of an embodiment.

Returning to the drawings, FIG. 4 illustrates several mechanisms by which a license can be provided to a PLS/personal mobile device 400 using a host 410, 420, 430. For purposes of this illustration, the personal mobile device can take the form of a secure memory card, a megaSIM card, a smart card, a mobile phone, a PDA, a multimedia player, or a PC, for example, and the host can take the form of a mobile phone, a PDA, a multimedia player, a PC, or a GPS navigation device, for example. In this embodiment, the PLS/personal mobile device 400 carries DRM-protected digital content and other files 440, a PLS client application 445 to execute on a host when possible, and a secure DRM license storage component 450. The DRM-protected content is preferably set at or before delivery to point to the PLS client 445 by name and, where the URL comes with the reference, to the actual license server(s) 460.

The operation of the three different hosts will now be described. The first host 410 is preinstalled with the PLS client application and is pre-configured with local name resolution. Accordingly, the preinstalled PLS client in the first host 410 contacts the license server(s) 460 to request the license from the license server(s) 460, and the delivered license is stored in the license storage 450 of the personal mobile device 400. With the second host 420, the PLS client 445 is loaded from the card 400, and the local name resolution configuration is updated. The PLS client 445 loaded from the card 400 contacts the license server(s) 460 to request the license from the license server(s) 460, and the delivered license is stored in the license storage 450 of the personal mobile device 400. The third host 430 is incompatible with a PLS, so it acquires the license from the license server(s) 460 using an intermediate redirection server 470.

Figure 5:
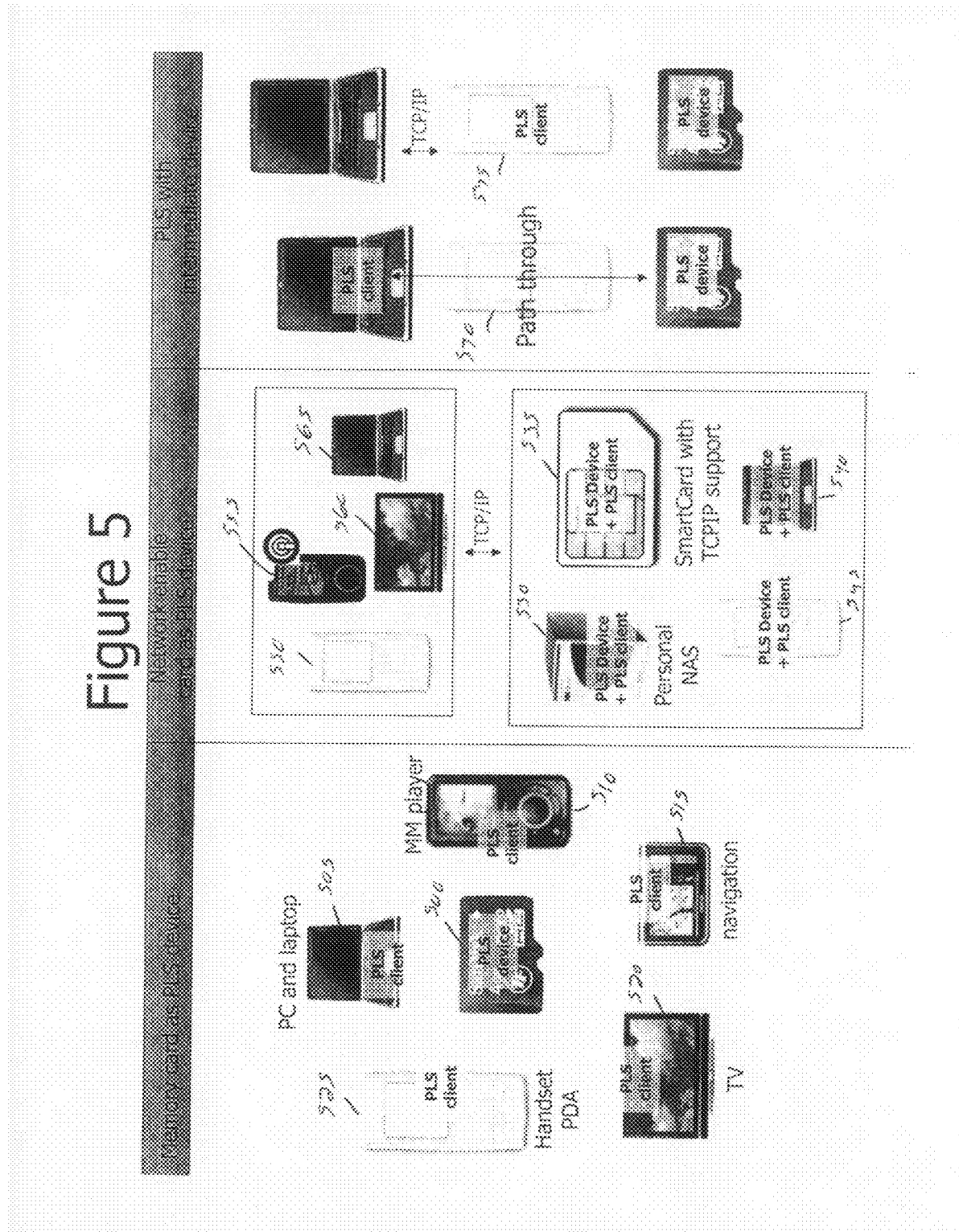
FIG. 5 is an illustration of exemplary implementations of a personal license server (PLS) of an embodiment in various consumer electronic devices.

Returning to the drawings, FIG. 5 illustrates various implementations of a PLS device and client on consumer electronic devices. As shown in the left portion of FIG. 5, a PLS device can take the form of a memory card 500, and the PLS client can run on a host device used with the memory card, such as a PC/laptop 505, a multimedia player 510 (e.g., MP3 players, video game machines, etc.), a GPS navigation system 515, a television or monitor 520, and a cellular phone handset or PDA 525. Whereas the PLS device and the PLS client were separate devices in the left portion of FIG. 5, in the middle portion of FIG. 5, the PLS device and the PLS client are in the same device, such as in a personal network-attached storage device 530, a SmartCard with TCPIP support 535, a PC/laptop 540, and a cellular phone handset or PDA 525. These devices can communicate, using TCP/IP, with a variety of host devices (e.g., a cellular phone handset or PDA 550, a multimedia player with wireless capability 555, a PC/laptop 565, and a television or monitor 560). Further, as shown in the right portion of FIG. 5, there can be an intermediate device 570, 575 that can act as a "pass through" or enable TCP/IP communication with another device.

As mentioned above, techniques can be used to format or change the URL to point to a personal license server application (the PLS client). Such PLS client, the PLS front end, is a network-enabled application that listens to a specific port for incoming license requests, interfaces with the PLS license store, and could interface to the actual license server according to the license status in order to deliver a license to its requester. Before turning to these techniques, a general discussion of network protocols is provided. Network protocols allow applications to share the network when exchanging data. Such applications come with an IP address (usually the one from the host) and listen for incoming data on a logical port. Some examples of ports commonly used by applications are port 80 (used by web server for a web browser to connect to) and port 443 (used to connect to a web server for SSL connection). These ports are part of the URL that points to the server for normal access over http (e.g., a website URL ending in ":80") and for secure access using SSL (e.g., a website URL ending in :444). Additional information coming after the server address (such as "product" in a website URL ending in ":80/product") is received as parameters by the server application. For example, some DRM systems use such parameters to specify a reference of the license required for a given piece of DRM-protected content. The complete URL comes with the protocol, the address of the license server and, with the addition of the license reference, among other information. Local server or network-enabled applications can be accessed by using the self address of the host or by using the loopback address (127.0.0.1) and by using the pre-defined port that such server or application listens to.

Figure 6:
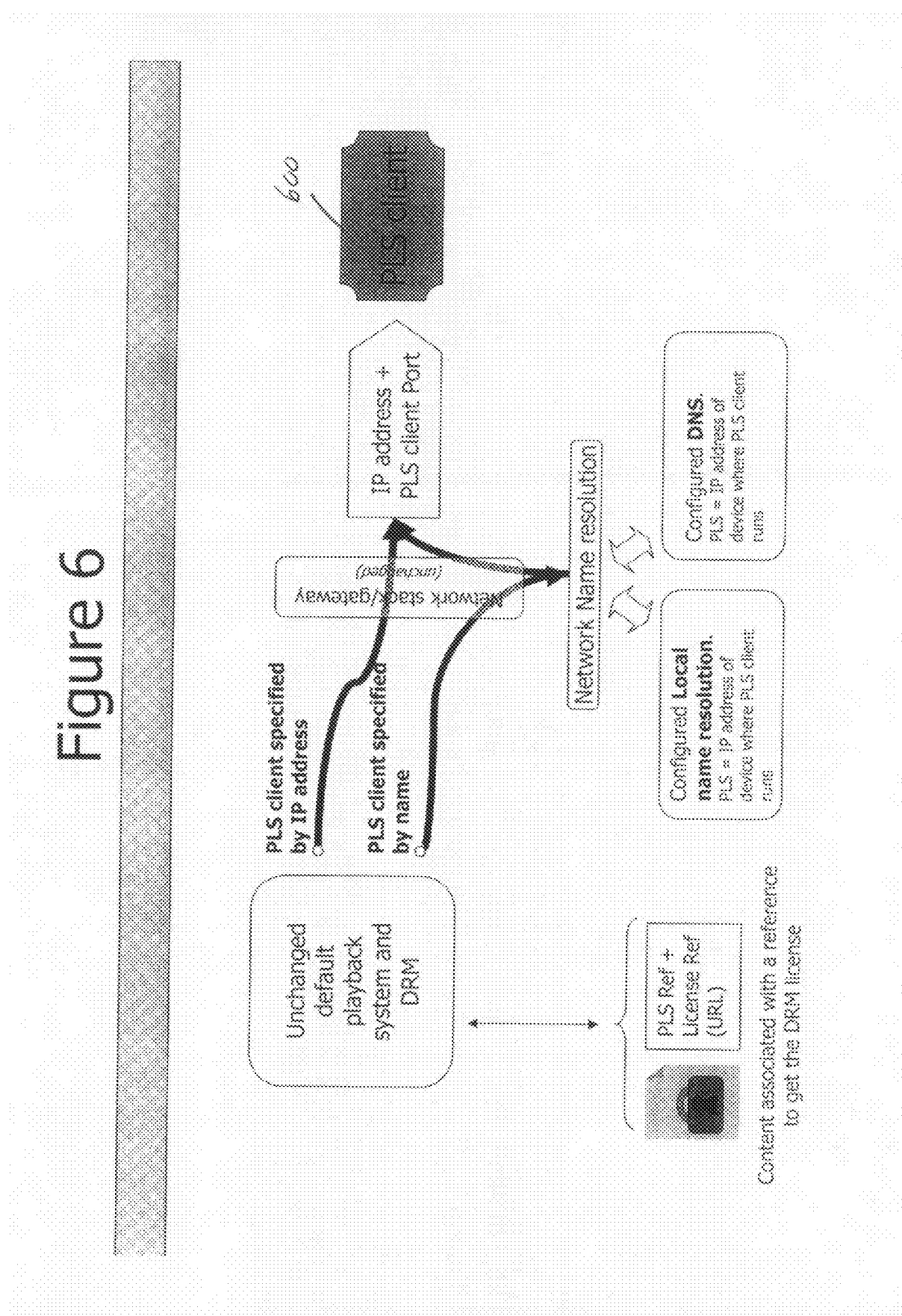
FIG. 6 is an illustration of various options to specify an address to reach a personal license server (PLS) of an embodiment.

There are different ways to configure the server name in the license server URL associated with the content to make the DRM system connect to the PLS client. As the PLS can be portable, and the configuration should preferably work with any configuration. FIG. 6 illustrates different options to specify the address to reach the PLS client 600. In general, the PLS client 600 address can be specified by network address or by name. When by name, the local name resolution or the domain name system "DNS" is preferably used to resolve the name into a network address.

The URL can use the server address 127.0.0.1 or the "localhost" name. These options present some limitations; namely, the PLS client 600 must run on the device requesting the license. The URL can be set with the current IP address of the PLS client 600. This also presents some limitations as the PLS client 600 should preferably be on the same network. It also requires a static IP address if the content is delivered with a preset associated URL. As mentioned above, the server name in the license server URL can point to the PLS client 600 by name. The name resolution provides the actual address of the PLS client 600 when on a compatible system. The local name resolution is configured to assign the actual license server address to the PLS client address. When on systems that cannot access the PLS client 600, the name resolution provides the address of the actual license server. This also comes with some limitations, as each license server name should preferably be added to the local name resolution, which could be cumbersome to do for some devices. Yet using the name resolution is clearly more flexible than the other methods, as it allows pre-loading and pre-configuring content with no need to know where the PLS client 600 will run. The name resolution can be configured by the PLS client or another application that knows that the PLS client can be reached.

The server name in the license server URL can be a name that uniquely identifies the PLS client on any network (as, for example, "www dot sandisk dot com" will go to the SanDisk website from any network using a DNS configured for accessing the Internet). The name resolution is configured on compatible systems to resolve that name into the PLS client address. While there are many advantages associated with this, one issue is that the name of the actual license server is missing from the URL. As is, the solution only works for a preloaded license, and it is not possible to renew and/or acquire a new license.

To complete the previous solution, the URL should preferably include parameters to reference the actual license server, and, to complete the PLS, one or more servers with the same name should reside on the network accessible from the license requester. These servers are globally referred as Intermediate Redirection Server as shown in FIG. 4. On systems that cannot access the PLS client 600, the name resolution refers to the Intermediate Redirection Server that is contacted instead of the PLS Client 600. The Intermediate Redirection Server parses the URL parameters and uses that information to redirect to the actual license server that could deliver a license for that content. For example the URL could be "plsclient dot corn slash www dot sandisk dot corn slash otherparameters" where "plsclient dot com" is the unique name for PLS Client and Intermediate Redirection Server, where "www dot sandisk dot com" means the actual server and where "otherparameters" contains among other information the reference of the license to acquire. The request is then redirected to "www dot sandisk dot com" as "www dot sandisk dot corn slash otherparameters." When redirected, information from the requesting device (such as its type, information from network header, etc) can be relayed as well. This solution provides the maximum flexibility and limits the integration to having the PLS client accessible and the local name resolution properly configured to point to the PLS client. Furthermore, it allows devices that cannot contact the PLS client to acquire a license from the main server which could be valuable when the user wants to access that content on that device. (FIG. 8, which will be described below, shows a flow chart overview of the process).

Furthermore, parsing the URL to find where to acquire a license from the main server is also something the PLS client can use when acquiring a license for the first time or when renewing a license (see discussion of FIG. 8 below). Other solutions can include storing the actual server information as a second URL associated with the DRM protected content, using a database on the PLS that contains the actual server address, or even using information from the license itself. That latest option means that all content should preferably be delivered combined with a license that includes the needed information to renew itself. For these other solutions that can be used when implementing without using the name resolution with intermediate server, the PLS client would fetch that information to acquire and/or renew a license.

Figure 7:
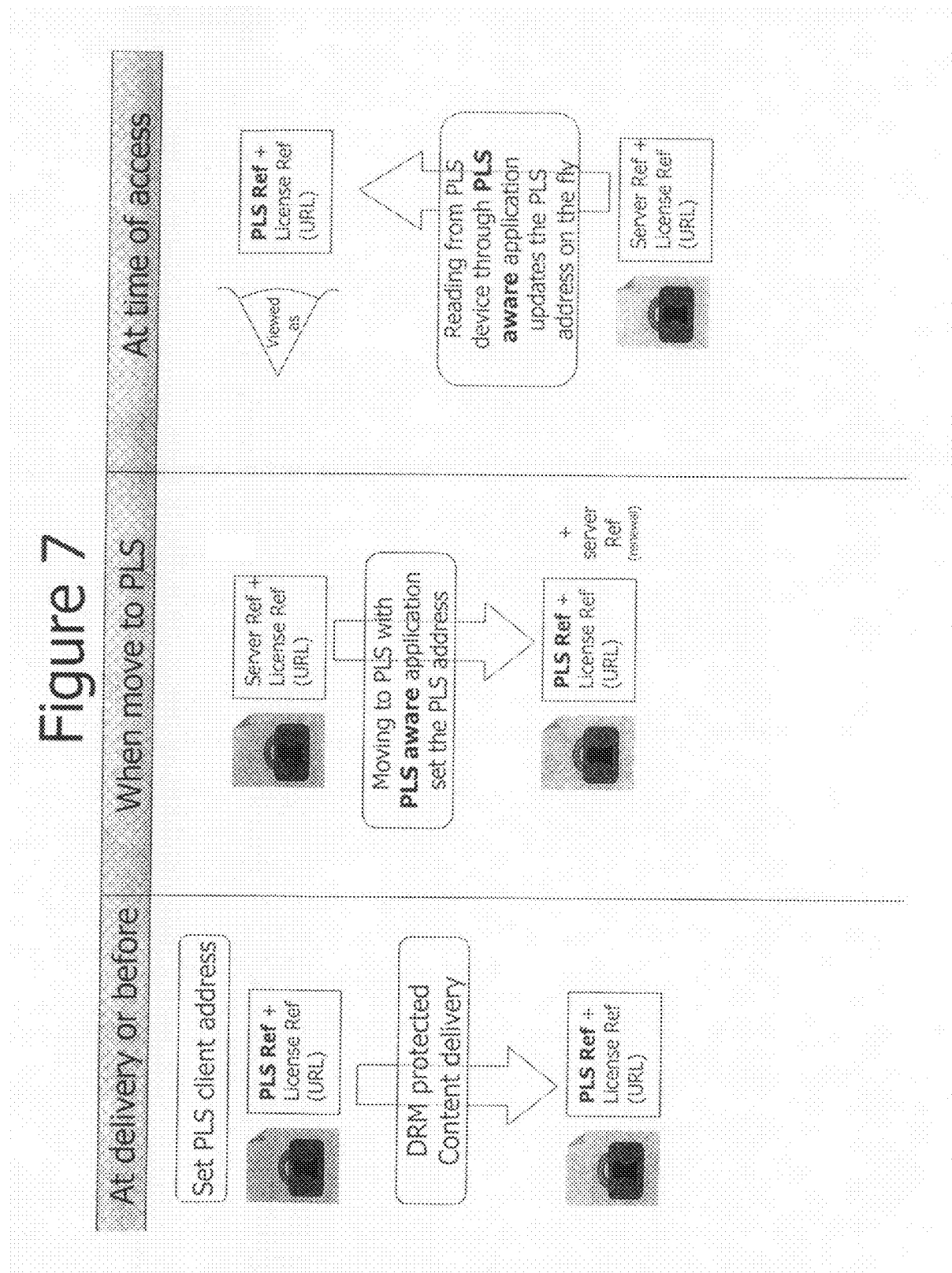
FIG. 7 is an illustration of various mechanisms to set an address of a personal license server (PLS) client of an embodiment.

Using name resolution and Intermediate Redirection Server (ISR) allows delivery, from a content server to a device, of content associated with a pre-set server name in the URL (i.e., the content is configured to work with PLS and the system uses the ISR to deliver a license otherwise). FIG. 7 shows different options to point to the PLS client address. As shown, the URL can be set at content delivery or before, the URL can be set when the content is moved to the PLS device, and the URL can be changed at time of access (the change can be temporary). Other solutions include changing the reference when the content is moved to the PLS device or received on a system where the PLS client runs. The URL can also be changed on the fly when the content is accessed on a system integrated for the PLS client. For example, a modified file system can perform this function.

Figure 9:
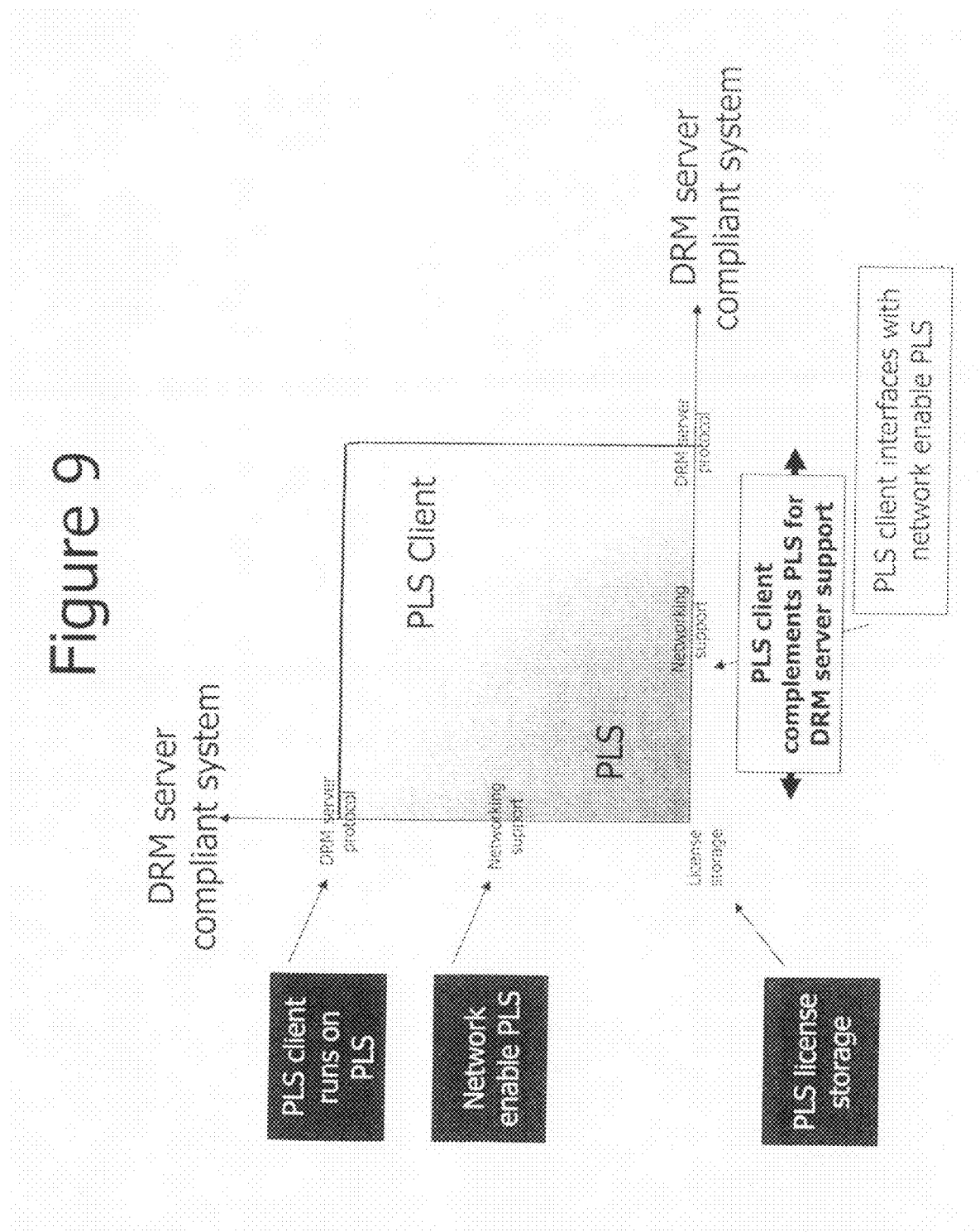
FIG. 9 is an illustration showing a relationship between a PLS client and a PLS.

The PLS client can perform more functions than just being a front end. The steps done by an actual license server can be similarly done by the PLS client or the PLS device according to the device capabilities. For example, FIG. 9 shows the symbiotic relationship where the PLS client supplements the PLS. In some cases, both the PLS and the PLS client can have the same functionality. This can occur, for example, when a PLS client communicates with a network-enabled PLS using network protocol. Also, the name resolution can be done by the PLS or the PLS client. In that case, the secondary device can be configured as such to have its primary DNS to be the PLS, or the PLS client can do the name resolution. This can be easily implemented on systems configured for the PLS.

Other functions range from the PLS client running on a network-enabled PLS device down to the PLS client handling the DRM protocol and the PLS device only providing secure storage of the DRM licenses. The PLS client can also check the DRM version of the requesting system and only deliver a license if it matches the required version for the content or the minimum version. The PLS client can also check the DRM type and deliver a license formatted accordingly. When running on same device as the license requester, the PLS client can get all information required to identify the DRM type and its current version. When running remotely, some information can be acquired from the network header and can also be used to find additional information. The PLS device can come with a database of devices, or that complement of information can be fetched online.

The PLS can also deliver a limited license, and the license delivered by the PLS can be different from the licensed it carries. The type, format, or permission can be set according to the content or the host. For example, content from a subscription whose license on the PLS provides permissions to play until a certain date can be delivered as license to play once or a license to play up to the duration of the content. The PLS can also deliver a license whose content key is replaced by a session key. That is particularly useful for devices which include technology like TrustedFlash™ where the content can be decoded and encoded on the fly with a session key used to protect to communication. Doing such allows protecting the actual content key and, thus, forces a hacker to redistribute the content, which is more difficult than the key.

The PLS client can also inform the PLS about the user (or device) that will deliver a license only if the user (or device) is authorized with current license. This allows implementing content binding where content or its associated license is made only available to authorized parties.

Figure 8:
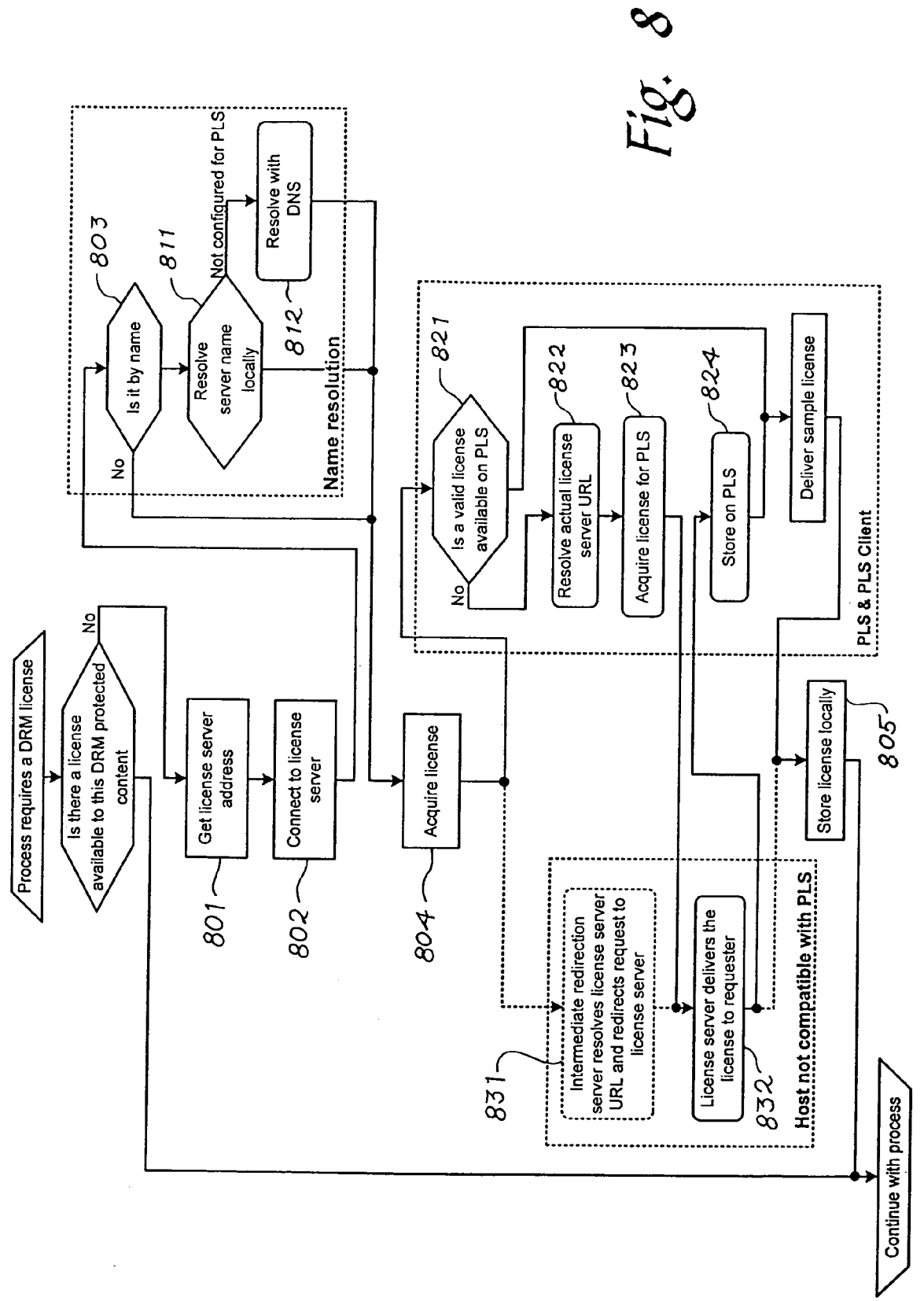
FIG. 8 is a flowchart of a method of an embodiment for getting a license.

Returning to the drawings, FIG. 8 shows a flow chart overview of the complete process of getting a license. At first, the license requester device checks its own license store to see if any valid license is available for the content being accessed. If it is, the flow continues with its normal process of accessing the content. It no valid license is available, the flow proceeds to step 801 to acquire a license. Step 803 is usually handled by the network that would resolve the name if needed into a network address. If this is a network address, the flow moves to step 804. If it is by name, the network will first use the local name resolution at step 811, and, if the name is not available, it would rely on a DNS at step 812. Step 811 would resolve to the PLS client address, and step 812 is expected to resolve to the intermediate redirection server when the PLS client is unreachable (a local DNS can be configured to point to the PLS client when accessible). Once the name is resolved after step 811 or 812, the process flow continues with the license acquisition at step 804. If the PLS client can be accessed, the name resolution would have resolved with the PLS client address as in step 821. The PLS checks for a valid available license. If no license is available, the PLS will start a license acquisition starting with resolving the actual license server URL at step 822 and then acquiring the license from the remote server at step 823. The remote server receives the request at step 832 and performs functions to deliver the license. At step 824, the license is received and stored by the PLS. It can also be verified before being stored. Finally, at step 825, a sample license is delivered to the license requester. The sample license does not have to match the one stored on the PLS, and the license can be delivered according to specific condition.

Going back after step 804, when the PLS client is unreachable, the name resolution does not have the address of the PLS client and resolves to the address of the intermediate redirection server. At step 831, the intermediate redirection server receives the request, parses and processes the URL and passes the request for a license to the actual license server. At step 832, the license server delivers the license. The license is stored on the requester device and preferably cannot be used by other devices, as the requester device does not support PLS. The process then continues.

It should be noted that many alternatives can be used with these embodiment. For example, the method of using a specific URL can be used for applications other than DRM, such as when contacting another local server (e.g., a smart card web server that runs a mobile network operator ("MNO") portal).

It is intended that the foregoing detailed description be understood as an illustration of selected forms that the embodiments can take and does not intend to limit the claims that follow. Also, some of the following claims may state that a component is operative to perform a certain function or configured for a certain task. It should be noted that these are not restrictive limitations. It should also be noted that the acts recited in the claims can be performed in any order—not necessarily in the order in which they are recited. Additionally, any aspect of any of the preferred embodiments described herein can be used alone or in combination with one another.

What is claimed is:

1. A personal license server of a first mobile device, the personal license server comprising:
   a memory; and
   circuitry configured to:
      receive a digital rights management (DRM) license from a license server, where the DRM license is configured for use by a playback system of the first mobile device that is associated with the personal license server of the first mobile device and wherein the first mobile device comprises both the personal license server and the playback system;
      store the DRM license in the memory;
      receive a redirected license request sent from a second mobile device that is distinct from the first mobile device, wherein the redirected license request originally specified the license server, but was redirected to the personal license server of the first mobile device; and
      in response to the redirected license request, communicate the DRM license from the personal license server of the first mobile device to the second mobile device;
   wherein the first mobile device that comprises the personal license server also comprises a personal license server client that communicates the redirected license request to the personal license server and that is operative to perform name resolution.

2. The personal license server of claim 1, wherein the personal license server client communicates with the personal license server using a same protocol as when communicating with the license server.

3. The personal license server of claim 1, wherein the personal license server client communicates with the personal license server using a different protocol than a protocol used to communicate with the license server.

4. The personal license server of claim 1, wherein the personal license server is part of a memory card.

5. The personal license server of claim 1, wherein the personal license server is part of a host device operative to be connected with a memory card.

6. The personal license server of claim 1, wherein the personal license server is part of a network-attached storage (NAS) device.

7. The personal license server of claim 1, wherein the DRM license provided to the second mobile device is different from the DRM license received by the personal license server.

8. The personal license server of claim 1, wherein the DRM license comprises a session key.

9. A method for using a personal license server of a first mobile device, the method comprising:
   receiving, with a personal license server, a digital rights management (DRM) license from a license server, wherein the DRM license is configured for use by a playback system of the first mobile device that is associated with the personal license server of the first mobile device;
   storing, with the personal license server, the DRM license;
   receiving a redirected license request sent from a second mobile device that is distinct from the first mobile device, wherein the redirected license request originally specified the license server, but was redirected to the personal license server of the first mobile device; and
   in response to the redirected license request, communicating the DRM license from the personal license server of the first mobile device to the second mobile device;
   wherein a personal license server client that communicates the redirected license request to the personal license server is operative to perform name resolution.

10. The method of claim 9, wherein the personal license server client communicates with the personal license server using a same protocol as when communicating with the license server.

11. The method of claim 9, wherein the personal license server client communicates with the personal license server using a different protocol than a protocol used to communicate with the license server.

12. The method of claim 9, wherein the personal license server is part of a memory card.

13. The method of claim 9, wherein the personal license server is part of a host device operative to be connected with a memory card.

14. The method of claim 9, wherein the personal license server is part of a network-attached storage (NAS) device.

15. The method of claim 9, wherein the DRM license provided to the second mobile device is different from the DRM license received by the personal license server.

16. The method of claim 9, wherein the DRM license comprises a session key.

* * * * *